United States Patent [19]

Greutmann

[11] 4,437,230

[45] Mar. 20, 1984

[54] MOTOR HAVING INSULATIONLESS ARMATURE CONNECTIONS

[75] Inventor: Hans Greutmann, Toledo, Ohio

[73] Assignee: Allied Corporation, Morris Township, Morris County, N.J.

[21] Appl. No.: 399,665

[22] Filed: Jul. 19, 1982

[51] Int. Cl.³ .............................................. H02K 15/09
[52] U.S. Cl. ..................................... 29/597; 29/598; 310/201; 310/234
[58] Field of Search .................. 29/597, 598; 310/201, 310/234, 202–208, 42

[56] References Cited

U.S. PATENT DOCUMENTS

| 1,742,190 | 1/1930 | Apple | 29/598 |
| 2,387,885 | 10/1945 | Davis | 29/597 X |
| 2,400,902 | 5/1946 | Allen | 310/201 |

*Primary Examiner*—Carl E. Hall
*Attorney, Agent, or Firm*—James P. DeClercq

[57] ABSTRACT

A method of preliminarily bending ends of windings in an armature assembly having at least two layers provides an armature assembly for a dynamoelectric machine that does not require a layer of insulation between terminal portions of conductive windings between the armature lamination assembly and the commutator. The preliminary operations may also include trimming of the free ends of the terminal portions of windings, so that a substantially, fully machined commutator assembly may be used, providing improved electrical contact during a resistance welding or brazing step for affixing the ends of the windings to respective commutator segments. The commutator segments may be manufactured without riser portions, resulting in a less costly assembly which is less susceptible to damage during handling during assembly.

6 Claims, 9 Drawing Figures

MOTOR HAVING INSULATIONLESS ARMATURE CONNECTIONS

The instant application refers to the field of electrical motors. In particular, the instant application relates to a method of forming the ends of windings in at least two layers, so that they may be connected to a commutator without placing an insulating layer between the layers of winding.

BACKGROUND OF THE INVENTION

In the manufacture of motors, in particular motors for high current applications, such as starter motors, a stack of armature laminations are pressed onto an armature shaft to define a laminated armature having a plurality of radial slots. Windings are placed in the slots, a commutator assembly is pressed onto the armature shaft, the commutator ends are positioned appropriately for a lap or wave winding, a layer of insulation in the form of a truncated hollow cone is placed between layers of conductive winding ends, and the ends are fastened to commutator segments. The commutator segments are typically provided with risers, in the form of two upstanding portions defining a slot for receiving the winding ends. The risers also act to retain the insulating layer in position while the winding ends are being connected to the commutator segments at the slotted risers. After this step, the commutators are machined to provide a commutation surface, and to trim the ends of the windings protruding from the slotted risers. It is believed that such motors have also been produced with an unmachined riserless commutator with an insulating layer between layers of winding. This would be a complicated manufacturing procedure due to the lack of risers to retain and position the insulating member, and would have a high reject rate in welding or brazing winding ends to the commutator using resistive heating, due to poor contact with the unmachined commutator. The commutator would then be machined to provide a commutation surface and to trim the ends of the winding ends connected to the commutator.

The instant invention provides a solution to these and other problems and difficulties of known manufacturing techniques.

SUMMARY OF THE INVENTION

The instant invention provides a method of making connection between winding ends in a two-layer winding to a riserless commutator which does not require an insulating layer between the winding ends in the interval between the armature laminations and the commutator, which provides a machined commutation surface for good electrical contact in resistance welding or brazing, and which does not require machining after assembly to trim ends of conductor ends connected to the commutator. However, a clean-up cut is preferably performed on the commutator surface after assembly, to remove any minor damage to the commutator segments which may occur during assembly steps.

In a motor according to the invention, armature laminations are stacked on a shaft to define a laminated armature having a number of radial slots, insulators are placed in the slots, winding elements of rectangular wire bent into a U-shape known as a hairpin loop, are inserted through the insulators with free ends protruding towards the commutator location. Multiple open loop windings such as disclosed in U.S. Pat. No. 4,270,065, dated May 26, 1981, may also be used in a two-layer configuration, particularly if openentry slots, rather than the illustrated closed entry slots are provided. More than two winding layers may also be used, however, an insulator may be necessary between some layers in that case.

Each upper or outer terminal end portion of a winding may be bent in either of two ways in accordance with the invention. In a first embodiment, it is bent towards the shaft in a first location and away from the shaft in a second location near its end, defining a first portion adjacent the armature laminations which is parallel to the shaft, a transition portion planted towards the shaft, and an end portion also parallel to the shaft. In a second and preferred embodiment, the upper or outer terminal portion is bent away from the shaft adjacent the armature laminations, then bent back towards the shaft, preferably in a smooth curve, and then bent away from the shaft to define an end portion parallel to the shaft. This method is preferred, since it gives a larger clearance between upper and lower conductors. With either embodiment, the lower conductors are bent in two places, a first bend adjacent the armature laminations being towards the shaft, and a second bend near the end away from the shaft, so that the end portion is parallel to the shaft.

These upper and lower conductors are then bent so that their free ends are adjacent, and then upper conductors are twisted in a first direction while lower conductors are twisted in a second direction about the shaft, such as may be appropriate for a lap or wave winding. The commutator assembly is installed in a conventional manner, and end portions of the upper and lower conductors which are aligned after the twisting operation are pressed against the appropriate commutator segment and brazed in placed.

Thus, it is the object of the invention to provide a method of manufacturing a rotor for a dynamoelectric machine with terminal portions of conductive windings in slots of a slotted armature bent in a preliminary operation so as to avoid the necessity for an insulating member between upper and lower terminal portions to protect them from shorting to each other either while they are being twisted to appropriate positions or while being fastened to the commutator segments, or in operation.

It is a feature of the operation that each lower terminal portion is bent towards the armature shaft at a first portion adjacent the armature core and away from the shaft at a second portion adjacent a free end of the lower terminal, and each upper terminal portion is bent in either two or three locations so that there is a gap defined between body portions of the upper and lower conductors when their respective ends are urged together. It is a feature of the invention that, since insulation is not required, commutator risers to retain the insulation in place are not necessary, facilitating the use of a lessexpensive riserless commutator, and allowing a preliminary trimming operation to be performed, thus permitting the commutator to be substantially fully machined at assembly, reducing the number of rejects due to bad electrical contact to a commutator segment when brazing conductor terminal end portions in place.

These and other objects, features and advantages of the invention will become apparent from the description which follows.

DETAILED DESCRIPTION OF THE INVENTION

Figure 1:
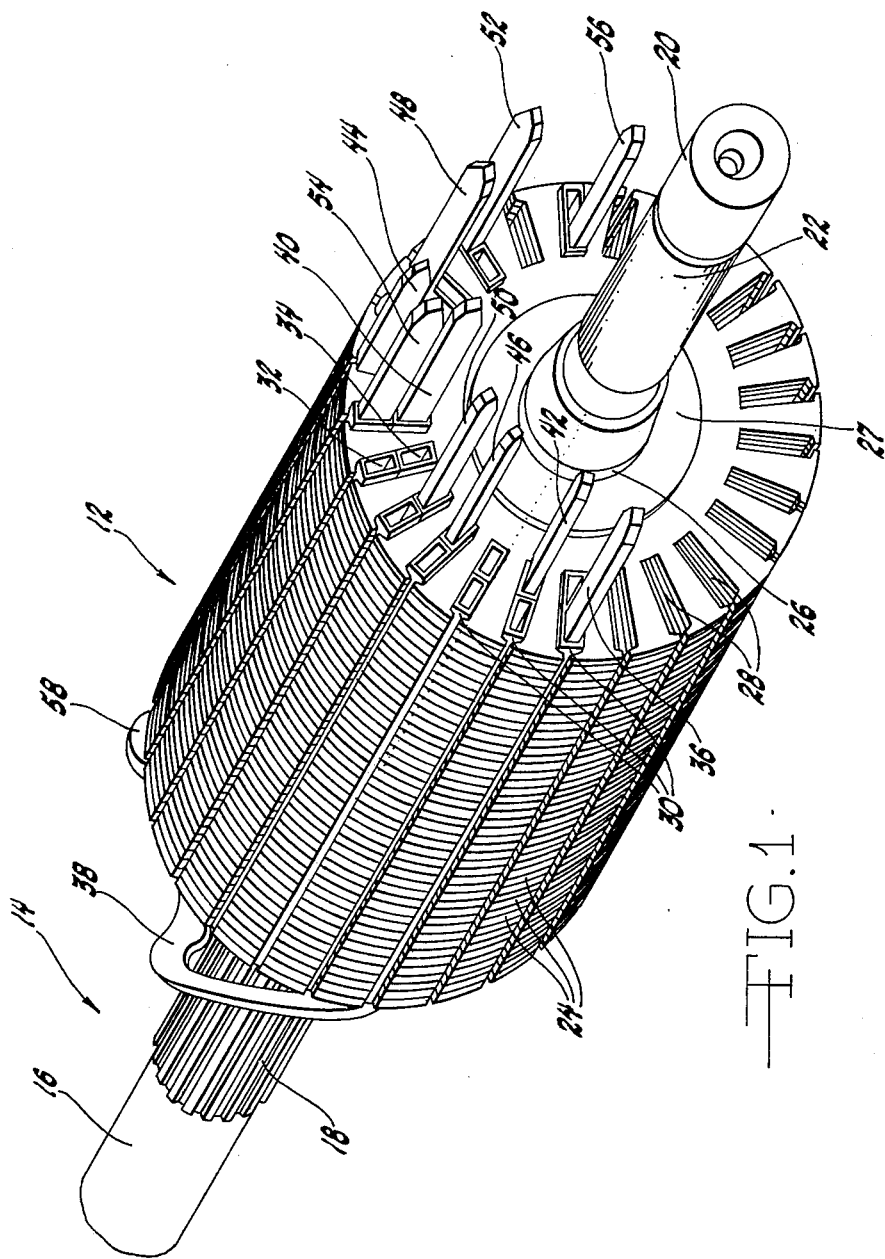
FIG. 1 is a perspective view of an armature assembly with some winding elements initially installed.

Referring to FIG. 1, there is shown an armature assembly 12, having a shaft 14 with a first end 16 including output splines 18. Output splines 18 are provided for use with a conventional inertia-type starter coupling. An actual embodiment of armature assembly 12 is used in a starting motor.

Shaft 14 also includes a second end 20, provided with serrations 22 for retaining a commutator assembly pressed on in the usual manner.

For clarity of illustration, armature assembly 12 will be shown only partially completed, since illustrating the full number of windings would result in obscuration of most of them.

As shown, armature assembly 12 includes a plurality of stacked armature laminations 24, which are stacked in an aligned manner and pressed onto shaft 14 in the conventional fashion. Armature laminations 24, when aligned, stacked and pressed into place on enlarged section 26 of shaft 14, and retained and supported by a retainer member such as retainer member 27, also pressed on to shaft 14, define a plurality of slots 28, illustrated closed-entry slots. An insulator 30 is disposed in each of slots 28. Insulator 30 is formed from a strip of insulating material folded into a B-shape, and inserted into each of slots 28. Each insulator 30 defines an upper or outer opening 32 therethrough and a lower or inner opening 34 therethrough. Then, as illustrated, a plurality of generally U-shaped winding elements are inserted through openings 32 and 34, one leg of each being passed through an opening 32 and its other leg being passed through an opening 34. As illustrated, there are five such U-shaped elements in FIG. 1. Each generally U-shaped winding element subtends a mechanical angle of approximately 90° in armature assembly 12. For instance, as illustrated, upper terminal portion 36, knuckle portion 38 and lower terminal portion 40 define one U-shaped winding element. Additional pairs of terminal portions are lower terminal portion 42 and upper terminal portion 44, lower terminal portion 46 and upper terminal portion 48, lower terminal portion 50 and upper terminal portion 52, and upper terminal portion 54 and lower terminal portion 56. Knuckle portion 58 interconnects portion 50 and 52.

In a conventional armature assembly, a ring or truncated hollow cone-shaped insulator would be placed between respective upper and lower terminal portions such as 40 and 54, since, as will be apparent, when they are twisted to final position and pushed towards shaft 14, there would otherwise be electrical shorts between various inner and outer terminal portions, resulting in a nonfunctional armature assembly.

Figure 2:
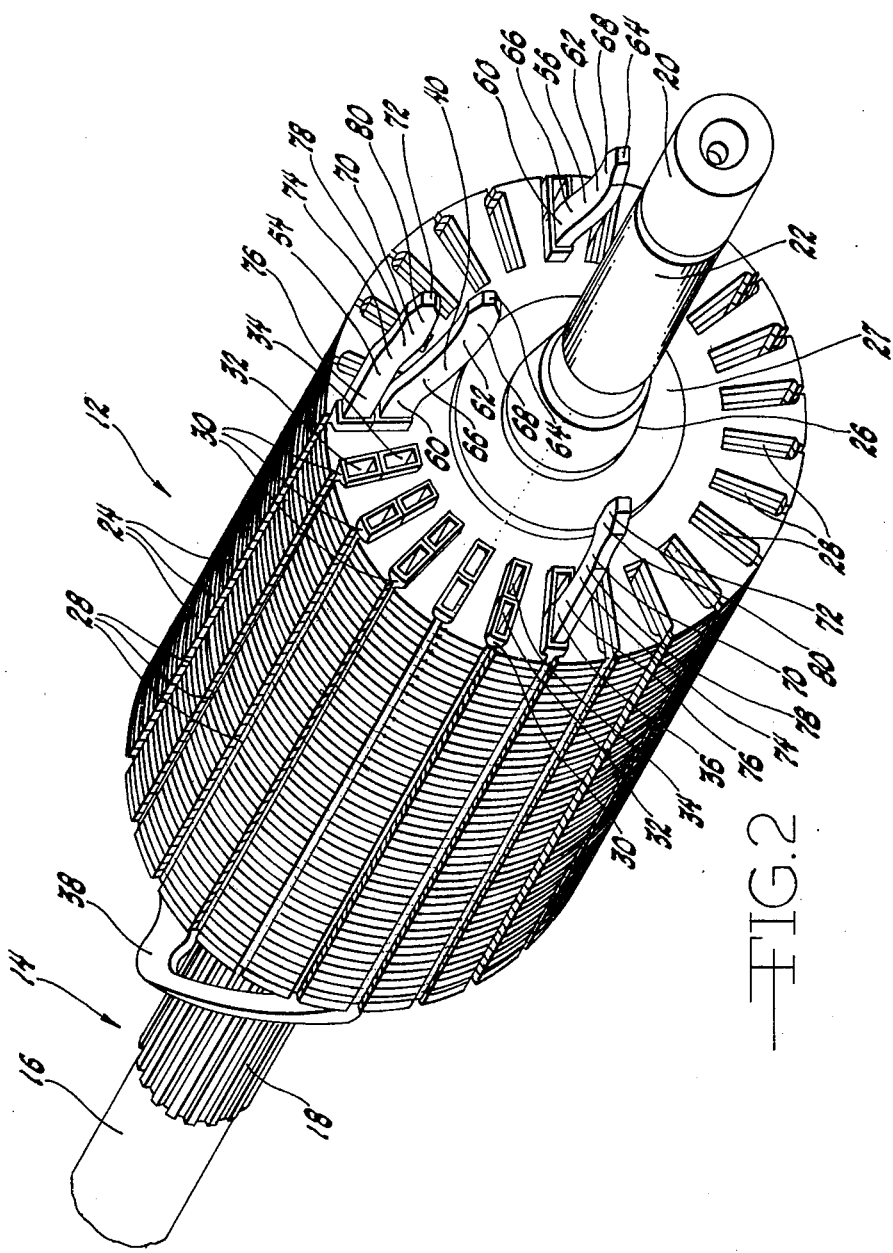
FIG. 2 is a perspective view similar to FIG. 1, showing some winding elements bent in accordance with the method of the invention.

In accordance with the invention, upper and lower terminal portions are bent into a predetermined shape before twisting and fastening to eliminate the need for an insulating member. As shown in FIG. 2, each lower terminal portion such as 40, 56, is bent toward shaft 14 at a first portion 60 adjacent the armature core, and bent away from shaft 14 at a second portion 62 adjacent free end 64, to form a first body portion 66 directed towards shaft 14 and a first end portion 68. With regard to upper terminal portions, it may be noted that they may be bent either as illustrated in FIG. 2, or in an alternate and preferred configuration shown in FIGS. 4 and 7, to provide a space or air gap between upper and lower terminal portions. In FIG. 2, upper terminal portions 36 and 54 are shown as having been bent away from shaft 14 at third portions 70 adjacent free ends 72 and bent towards shaft 14 at fourth portions 74 near third portions 70 and between portions 70 and the armature core, to form a second body portion 76 generally parallel to shaft 14, a transition portion 78 directed towards shaft 14 and a second end portion 80 parallel to shaft 14. As will be apparent from FIGS. 4 and 7, bending the upper terminal portions away from the shaft adjacent the armature core assembly before directing them back towards the shaft will yield a greater, and more preferable spacing between upper terminal portions and lower terminal portions.

Figure 3:
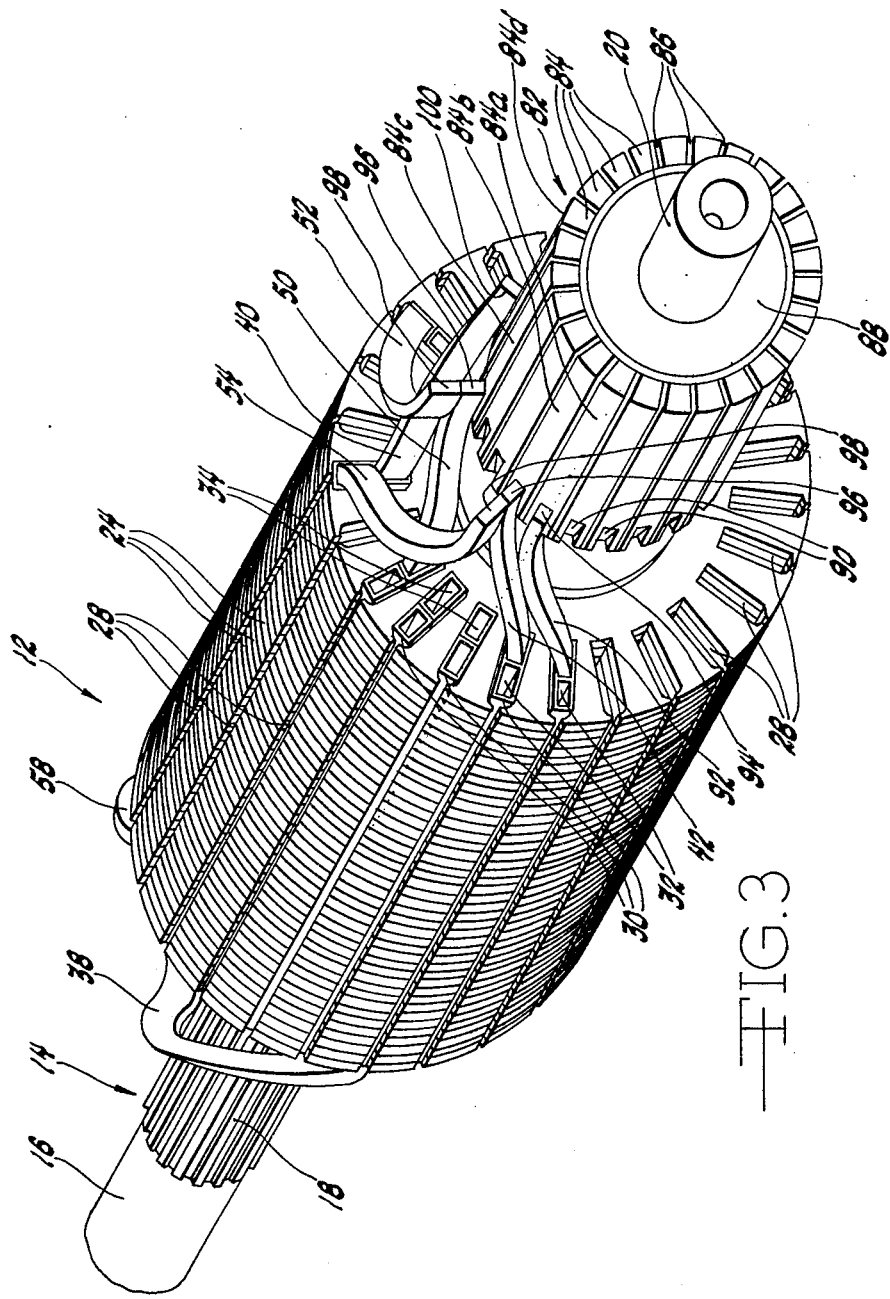
FIG. 3 is a perspective view similar to FIGS. 1 and 2, showing winding ends twisted in opposite directions to align with commutator segments as appropriate for a single-turn lap winding.

Referring now to FIG. 3, armature assembly 12 is shown as including a commutator assembly 82 pressed into position over serrations 22. Commutator assembly 82 is conventional in all respects other than the absence of risers, the provision of locating notches, and the fact that the commutator surface may be substantially fully machined before assembly. The lack of risers represents a substantial savings in the copper material from which a commutator surface is formed, and the substantially-completed surface machining resulting in better contact during a subsequent brazing operation, with substantial elimination of "blow-outs" due to poor contact and resulting in scrapping the entire assembly. Also, if the commutator bars are made by casting, a further material savings could be obtained by casting the notches in the commutator bars. As shown, commutator assembly 82 contains a plurality of commutator bars 84, separated by insulation such as mica insulation 86, retained by a retainer member 88. Commutator bars 84 and retainer member 88, cooperate in conventional fashion, bars 84 and retainer member 88 defining mating dovetail portions. Each commutator bar is provided with a groove 90. Groove 90 is not essential to the practice of the invention, but does facilitate the initial positioning of terminal portions of conductor windings during the bonding operation, as well as providing an enlarged bonding surface. As illustrated, a lower terminal portion 92, together with lower terminal portions 42, 50 and 40 are bent in a clockwise direction to align with commutator bars 84a, 84b, 84c and 84d, respectively. Upper terminal portions 54 and 52 are shown as bent in a counterclockwise direction to align with commutator bars 84b and 84c, respectively. In addition, as shown, the free ends of terminal portions 52 and 54 are brought into alignment with free ends of terminal portions 50 and 42, respectively. As shown, the ends of all upper and lower terminal portions have been sheared or trimmed to a squared-off configuration, lower terminal portion 92 having a sheared or trimmed terminal end 94, lower terminal portion 42 having a sheared or trimmed terminal end 96, aligned with sheared or trimmed end 98 of upper terminal portion 54. Lower terminal portion 50 has a sheared or trimmed end 96, aligned with a sheared or trimmed end 98 of upper terminal portion 52. Finally, lower terminal portion 40 has a sheared or trimmed end 100. Because of these sheared or trimmed ends, it is not necessary that machining of the commutator surface be deferred until after the bonding or brazing step, since it is not necessary that the machining remove the ends of the windings bonded to the commutator segments.

Figure 4:
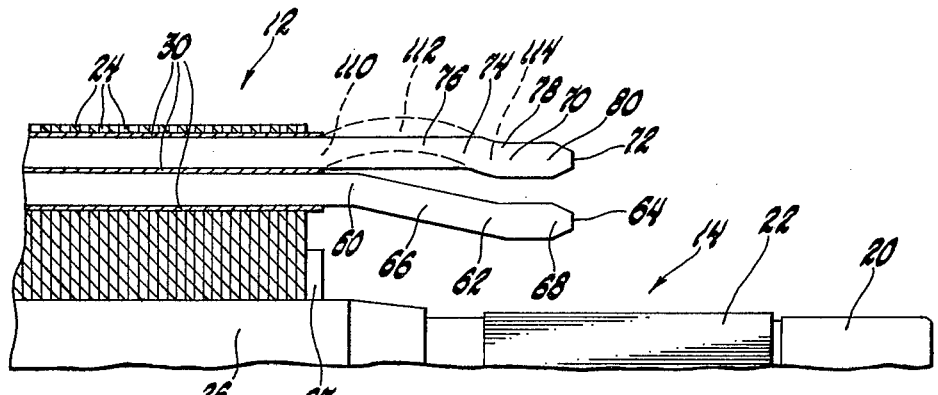
FIG. 4 is a segmental view, partially in section, showing conductor ends bent in accordance with first and preferred methods according to the invention in an initial stage.

Referring now to FIG. 4, a side view of a single pair of upper and lower terminal portions is shown, illustrating two of the possible ways of bending the upper terminal portion in accordance with the invention. The lower terminal portion is bent as described above. As shown, the upper terminal portion may be bent at 70 and 74 defining portions 76, 78 and 80, or may be bent as shown in broken line. As shown in broken line, each upper or outer terminal portion is preferably bent away from shaft 14 at a fifth portion 110 adjacent the assembly of laminations 24, bent back towards shaft 14 at a sixth portion 112, and bent again away from shaft 14 at seventh portion 114 between portion 112 and free end 72. As illustrated, the bend at portion 112 is a smooth and arcuate bend, forming a third body portion which is generally parallel to the shaft, although somewhat curved with respect to it, and a third end portion parallel to the shaft. It should be noted that the curvature of the bend in area 112 is exaggerated for clarity, since, among other things, the inherent elasticity of the copper winding material below its yield point causes it to somewhat recover its shape before deformation.

Figure 5:
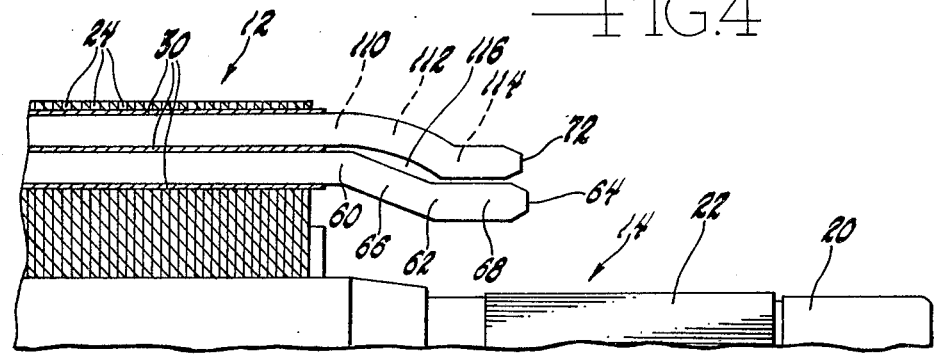
FIG. 5 is a view similar to FIG. 4, showing the gap or clearance resulting when terminal ends are pressed together.

FIG. 5 illustrates the position of upper and lower terminal portions after their free ends have been urged towards each other. In an actual embodiment of the invention, this step occurs when the terminal portions are being twisted in opposite directions to align properly with commutator segments. In FIG. 5, no distinction is being made between the results of bending at portions 110, 112 and 114, and the results of bending at portions 70 and 74, since the difference is not clearly visibly apparent after ends 72 and 64 are urged towards each other and twisted in appropriate directions, although a larger gap 116 between the two conductors is obtained.

Figure 6:
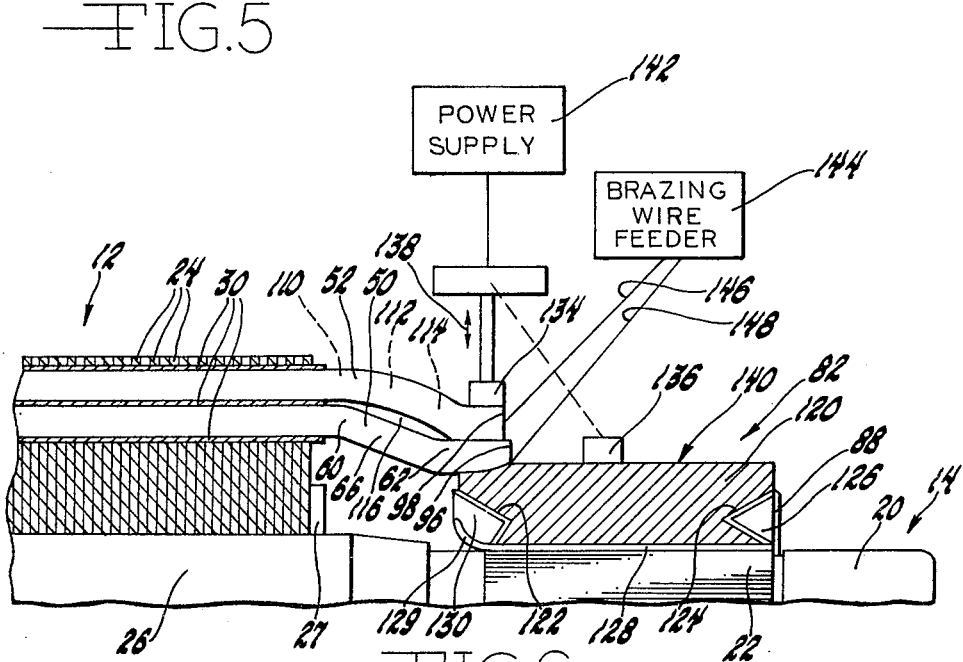
FIG. 6 is a view similar to that of FIG. 5, illustrating the step of joining conductor ends to a commutator bar segment.
Figure 9:
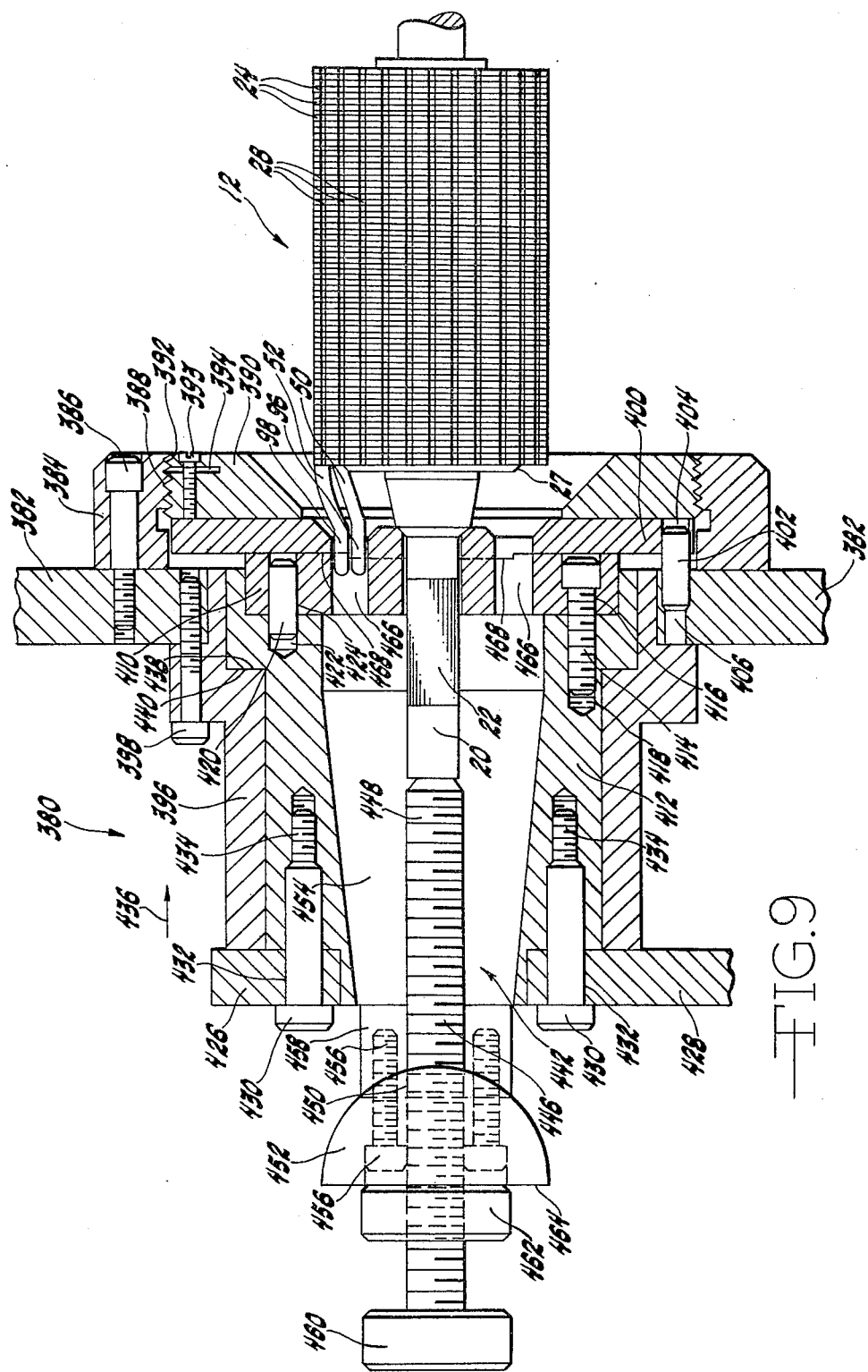
FIG. 9 is a partially sectional illustration of the preferred construction of a mechanism for trimming the ends of upper and lower terminal portions of the windings.

FIG. 6 illustrates the step of bonding the upper and lower terminal portions to a commutator bar, by brazing. The construction of a commutator assembly according to the invention is also illustrated. Each commutator segment 120 defines V-shaped dovetail portions 122 and 124 at opposite ends thereof. Retainer member 88 includes a V-shaped portion 126 concentric with shaft 14 and adapted to cooperate with each dovetail portion 124, a tubular portion 128 which cooperates with serrations 22. A portion 130 which is preferably made to cooperate with dovetail portion 122, is retained in place by rolling an end 129 of portion 128 outwardly as shown. As will be apparent, commutator assembly 82 is pressed into place in conventional manner, with due care being made to properly orient each commutator segment 120 with respect to the conductor slots 28 of armature assembly 12. Then, the assembly is placed in appropriate fixturing, the design of which will be apparent to one skilled in the art, for the bonding operation. As illustrated, the terminal portion free ends have been sheared as illustrated in FIG. 9. A brazing current contact member 134, and a brazing current return contact member 136 are moved downward in the direction indicated by arrow 138, member 134 urging the free ends of upper and lower terminal portions 50, 52 against each other and urging the free end of the lower terminal portion into groove 90, if provided. Member 136 likewise establishes good electrical contact with the machined surface 140 of commutator assembly 82. Brazing current through contact members 134 and 136 is supplied by a power supply 142. When the interfaces between conductive elements are suitably heated by the passage of current from power supply 142, through contacts 134, 136, a brazing wire feeder 144 or other appropriate device or manual operation feeds a first brazing wire 146 against surface 98 and the interface between terminal portions 50 and 52, and feeds simultaneously a second brazing wire 148 against end 96 and the interface between a lower terminal portion such as 50 and a commutator segment such as segment 120. The brazing wire will thus melt and flow to join an upper terminal portion and a lower terminal portion to a commutator segment. As is conventional, current from power supply 142 is stopped a short period of time before contact members 134, 136 are moved upwardly in the direction of 138 away from shaft 14, to allow the brazing material to solidify. Subsequent to this operation, a minor amount of machining of machine surface 140 is preferably performed, to remove minor surface irregularities that may be caused by the contact pressure of contact member 136, or by a reaction force against a diametrically-opposite commutator segment against a support surface, since it is desirable that a commutator surface be as smooth and concentric as possible.

Figure 7:
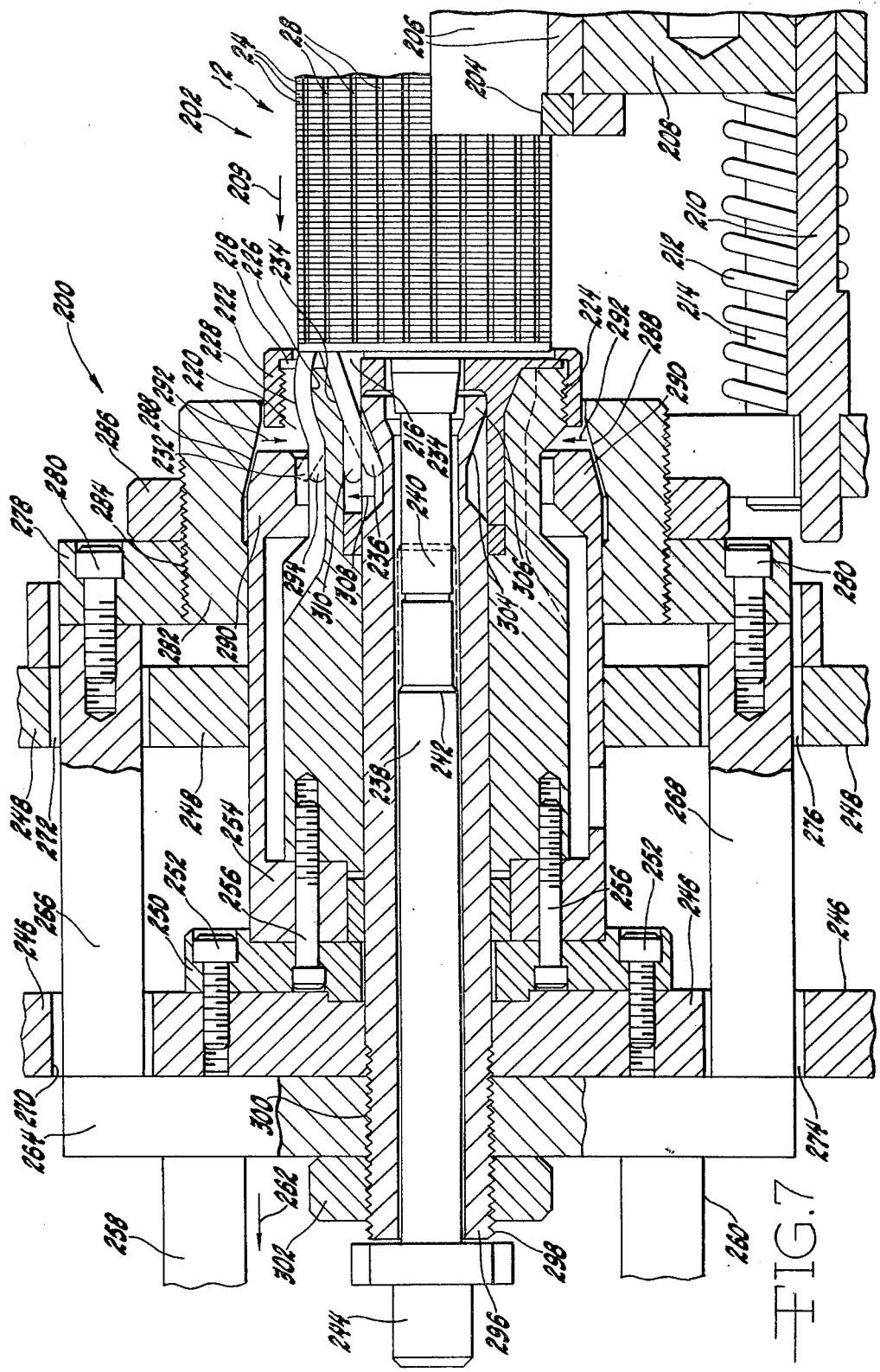
FIG. 7 is a partially sectional view illustrating the preferred construction of a mechanism for initially bending upper and lower terminal portions of the windings.

FIG. 7 shows the structure and function of the forming die used for initial formation of the upper and lower terminal portions of the windings. Forming die 200 is shown in a partially sectional view taken along a diameter, and since there are an odd number of conductor slots 28 in armature assembly 12, die 200 appears as nonsymmetrical in a diametral cross section. Also, the die 200 is preferably positioned so that the axis of shaft 14 is vertical, with the downward direction shown to the left in FIG. 7-9.

For convenience, the individual members of die 200 will be described in terms of their function or movement in the following description of the initial forming operation.

An armature assembly 12, such as is shown in FIG. 1 is clamped into cradle assembly 202 by a clamping collar, not shown, with key member 204 aligned with one of slots 28, and the radial peripheral surface of laminations 24 resting against cradle member 206, retained to cradle support member 208 in conventional fashion, such as by bolts, not shown. Cradle member 206 may be adjustable with respect to member 208 to properly orient the armature assembly 12 about the axis of shaft 14.

Then, cradle assembly 202, carrying armature assembly 12, is moved in the direction of arrow 209, guided by guide pins 210, and compressing springs 212 on spring guide pins 214. As shown, respective upper and lower terminal portions pass through apertures 216 in aperture member 218, secured to stationary forming member 220 by collar member 222 which engages member 220 at threads 224.

As an outer or upper terminal portion such as terminal portion 54 shown in FIG. 2 moves into stationary forming member 220, it is deflected outwardly by surface 226, then deflected inwardly by surface 228, and then again directed outwardly by surface 230 to an initial position shown in broken lines at position 232.

Meanwhile, an inner terminal portion such as portion 40 shown in FIG. 2 is being deflected inwardly by surface 234 to the position shown in broken lines at position 236. As end 20 of shaft 14 is moved in the direction of arrow 209, stop member 238 simultaneously moves in the direction of arrow 209 from the position illustrated.

As shown in FIG. 7, certain parts of die 200 are fixed, and certain parts are moving parts. Support members 246 and 248 are ridgedly affixed to a frame member, not shown, as is a hydraulic cylinder, not shown, for moving the moving parts. Intermediate member 250 is mounted to support member 246 by bolts 252, and forming members 220 and 254 are attached to member 250 by bolts 256. Members 258 and 260 are attached to the hydraulic cylinder, not shown, mentioned above, for movement in the direction of arrow 262.

An intermediate member 264 is attached to members 258 and 260, and supports member 266 and 268. Member 266 passes through hole 270 in member 246 and hole 272 in member 248, while member 268 passes through holes 274 and 276 in members 246 and 248 respectively. Distal to member 264, a plate member 278 is attached to members 266 and 268 by bolts 280. A cam collar member 282 threadably engages plate 278 at threads 284, and is locked in position by nut member 286.

When members 258, 260 are moved in the direction of arrow 262, cam surface 288 of cam collar member 282 forces ends 290 of forming members 254 to move radially inwardly in the direction of arrows 292, forcing the respective ends of upper or outer terminal portions such as end 72 from the position shown in broken lines at position 232 to the position shown in solid line at position 294.

Simultaneously, third forming member 296 also moves in the direction of arrow 262. As shown, third forming member 296 is a generally tube-shaped member with external thread 298 which pass through threaded aperture in member 264, retaining it to member 264. It is locked in position by jam nut 302 cooperating with threads 298 and member 264. As third forming member 296 moves in the direction of arrow 262, cam surfaces 304 formed in the radial periphery of third forming member 296 adjacent end 306 force a free end of a lower terminal portion, such as an end 64 shown in FIG. 2, to move in the direction of arrow 308, from the position shown in broken lines at position 236 to the position shown in solid lines at position 310. At the completion of this step, the respective upper and lower terminal portions are formed as shown in FIG. 2.

Figure 8:
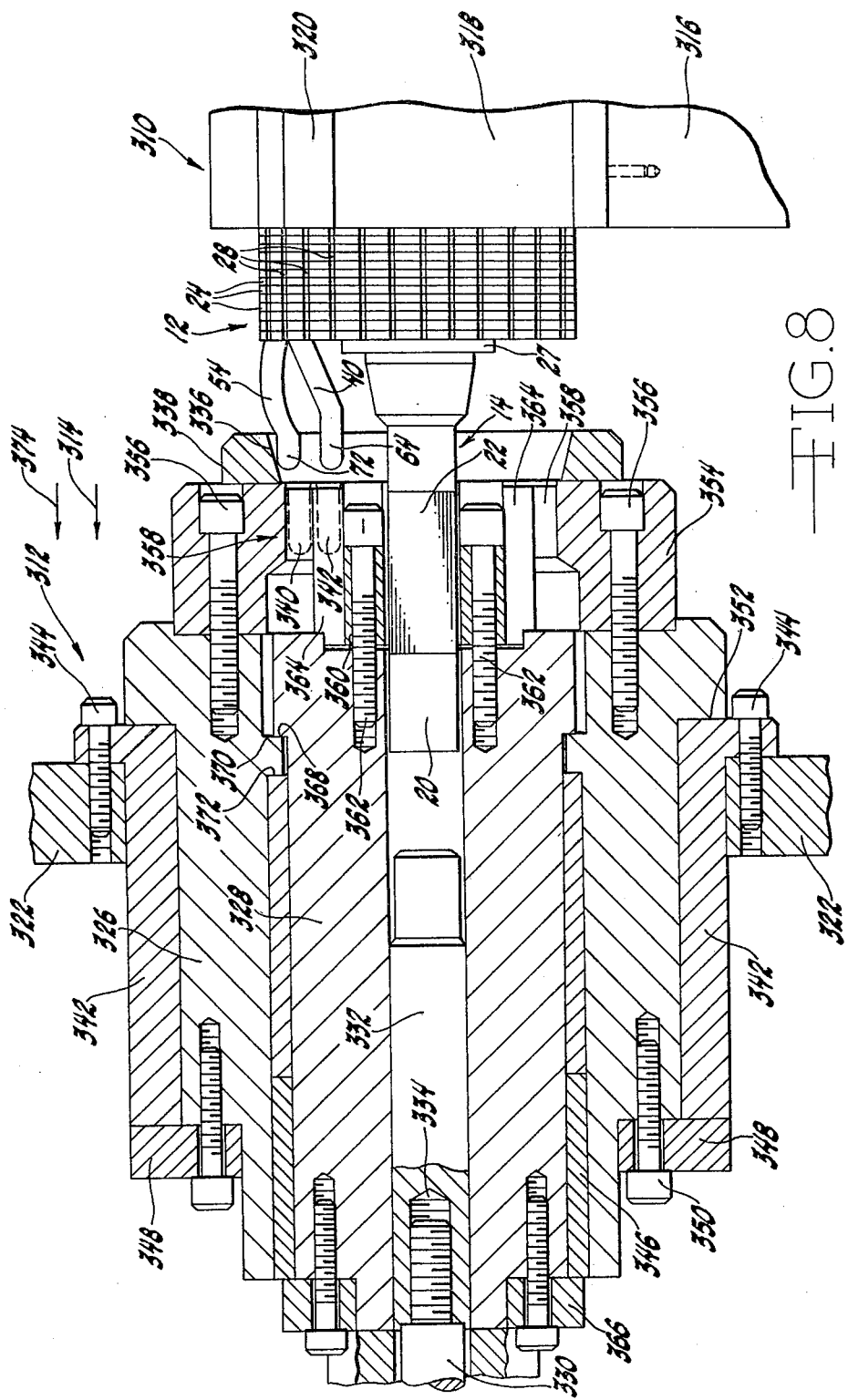
FIG. 8 is a partially sectional view, showing the preferred construction of a mechanism for twisting upper and lower terminal portions of the windings to positions similar to those shown in FIG. 3.

FIG. 8 shows the die for twisting the upper and lower terminal portions in different directions, to their proper positions as illustrated in FIG. 3. In the actual method of producing an armature assembly according to the invention, an armature assembly 12 is clamped into a clamping assembly 310, and clamp 310 is moved towards forming die assembly 312 in the direction of arrow 314. Clamping assembly 310 includes a base member 316, operably attached to a hydraulic cylinder, powered by pressurized oil or gas, not shown, a cradle member 318, and a clamp member 320. Forming die 312 is supported by supports 322, and rotated in a first direction such as by means of an arm integral with retainer ring 348, not shown, which is perpendicular to the plane of the illustration, operably coupling a hydraulic cylinder, preferably actuated by pressurized air, and first frame member 326, and rotated in a second direction such as by an arm integral with retainer ring 366 attached to second frame member 328. Such an arm is perpendicular to the plane of the illustration interconnecting second frame member 328 and an air cylinder, not shown. A hydraulic cylinder, not shown, having a rod end 330 threadably engaging stop member 332 at threaded bore 334 serves to eject end 20 of shaft 14 after the completion of the forming operation.

As clamping assembly 310 is moved in the direction of arrow 314, surface 336 of cam ring 338 will engage the end such as free end 72 of an upper terminal portion such as upper terminal portion 54, forcing it inward towards shaft 14 to the position shown in dotted lines as position 340. The radial position of free end 64 of an inner or lower terminal portion such as lower terminal portion 40 is not changed in radial position as it moves to the position shown in broken lines as position 342. This results in the positioning shown in FIG. 5, above.

When first frame member 326 is rotated in a first direction, such as a counterclockwise direction, in any convenient manner, it rotates with respect to support ring 342, which is fastened to supports 322 by bolts 344, and with respect to second frame member 328 on bushing means 346. Retainer ring 348 retained to first frame member 326 by bolts 350 cooperates with shoulder 352 of first frame member 326 to entrap member 326 within support ring 342 against independent movement in a direction parallel to the direction of arrow 314. As will be apparent, when first frame member 326 is rotated, ring member 354, fastened to it by bolts 356 will also rotate. As illustrated, ring member 354 includes a plurality of first pockets 358 adapted to receive free ends of upper or outer terminal portions such as terminal portion 54, which will then be rotated in a first direction such as a counterclockwise direction with respect to shaft 14. When second frame member 328 is rotated in a second direction, such as a clockwise direction, inner ring member 360, fastened to member 328 by bolts 362 will also rotate. As will be apparent, inner ring member 260 defines a plurality of pockets 364 for receiving lower or inner terminal portions of conductive windings such as free end 64 of terminal portion 40, so that inner terminal portions with free ends such as end 64 of terminal portion 70 positioned in position 342 will be rotated in a second direction with respect to shaft 14. A retainer ring 366 is bolted to second frame member 328, and prevents frame member 328 from linear movement with respect to frame movement 326, since shoulder 368 of member 328, cooperating with shoulder 370 of member 326 prevents movement in the direction of arrow 314 of member 328, and retainer ring 366, bearing upon bushing means 346 urging it against shoulder 372 of first frame member 326 prevents relative movement in the direction of arrow 314. Upon completion of the forming operation, rod end 330 is caused to move in a direction opposite to the direction of arrow 314 with respect to second frame member 328, bearing upon second end 20 of shaft 14, ejecting armature assembly 12.

Following the completion of the operation depicted with reference to FIG. 8, the free ends of upper and lower terminal portions are trimmed or squared, to avoid the necessity of subsequent machining of the commutator surface to perform this function, and allowing the use of a substantially completely machined commutator for good contact during the brazing operation which follows.

As shown in FIG. 9, trimming die 380 is supported on support member 382. Ring member 384 is ridgedly fastened to member 382 by bolts 386, and includes internal threads 388. An entrance cone ring member 390 is provided with external threads 392 cooperating with threads 388 to retain it to member 384. A screw member 393 closes slot 394 to prevent entrance cone member 390 from unscrewing from ring member 384. A stepped, tubular guide member 396 is firmly affixed to support member 382 by bolts 398, and a fixed shearing die 400 is also fixed with respect to support member 382 by pin 402, cooperating with an aperture 404 in fixed shearing die 400 and an aperture 406 in support member 382. A movable shearing die 410 is firmly affixed to an inner frame member 412 by bolts 414 cooperating with an aperture 416 in movable shearing die 410 and a threaded aperture 418 in inner frame member 412, and by a pin member 420 cooperating with an aperture 422 in inner frame member 412 and an aperture 424 in movable shearing die 410. Retaining ring member 426 including torque arm 428 is fastened to inner frame member 412 by means of bolts 430 cooperating with apertures 432 through retaining ring member 426 and threaded apertures 434 in inner frame member 412. As shown, retaining ring member 426 prevents motion of inner frame member 412 with respect to guide member 396 in the direction of arrow 436, while the cooperation between shoulder 438 of inner frame member 412 and shoulder 440 of stepped guide member 396 prevents relative motion in a direction opposite to that of arrow 436. As shown, an armature assembly 312 that has previously been processed by the mechanism shown in FIGS. 7 and 8 is inserted into die 380 until end 20 of shaft 14 contacts adjustable stop member 442. Adjustable stop member 442 includes a threaded member 446 which has a first end 448 which contacts end 20 of shaft 14, and passes through a threaded aperture 450 in an arc-shaped nut member 452, which is in turn retained to a bridge member, not shown, interconnecting spacer members 458 by bolts 456 passing through apertures in the bridge member. Aperture 454 allows trimmed-off portions to fall away, and the arc-shape of nut member 452 sheds these trimmed-off portions. The position of stop member 442 may be adjusted by turning knob 460, and locked in place by jam nut 462 bearing against surface 464 of nut member 452. With the armature assembly 12 in this position, aligned upper and lower terminal portions such as lower portion 50 and upper portion 52, as shown in FIG. 3, pass through an aperture 466 defined by aligned apertures in fixed shearing die 400 and movable shearing die 410. When torque arm 428 is moved in a direction perpendicular to the plane of the illustration of FIG. 9, inner frame member 412 rotates, rotating movable shearing die 410, and shearing upper and lower terminal portions such as 50, 52 along shear line 468, trimming the free ends of respective upper and lower terminal portions to define sheared or trimmed ends 96 and 98, also shown in FIG. 3. The removed portions are shown in broken lines in FIG. 9. Also, as may be noted in FIGS. 6 and 9, upper terminal portions are trimmed or sheared to a slightly shorter length than lower terminal portions. This facilitates the proper feeding of brazing wire 146, 148, and facilitates visual inspection to insure that the bonding or brazing step was properly performed.

It is believed that, even without the assistance of the illustrations of FIGS. 7, 8 and 9, appropriate dies and other tooling for constructing an armature in accordance with the invention may be easily fabricated by one skilled in the appropriate art from the description of the resulting structure.

Thus, as explained in detail above, the inventive concept provides a simplified and more reliable method of assembling an armature for a dynamoelectric machine.

As will be apparent to one skilled in the art, various modifications and variations of the invention may be made without departing from the spirit and scope of the invention.

I claim:

1. A method of manufacturing a rotor for a dynamoelectric machine, comprising the steps of:

providing an armature shaft having a slotted armature core mounted thereto;

placing a plurality of conductive windings in slots of said slotted armature to form at least a two-layer winding, each said slot containing at least an upper conductor and a lower conductor, each said upper conductor having an upper terminal portion and each said lower conductor having a lower terminal portion, said upper terminal portion and said lower terminal portion being disposed adjacent a first end of said armature shaft;

bending each said lower terminal portion toward said shaft at a first portion adjacent said armature core and away from said shaft at a second portion adjacent a free end of said lower terminal to form a first body portion directed towards said shaft and a first end portion parallel to said shaft;

bending each said upper terminal portion away from said shaft at a third portion adjacent a free end of said upper terminal portion and bending each said upper terminal portion towards said shaft at a fourth portion adjacent said third portion and distal to said armature core to form a second body portion parallel to said shaft, a first transition portion directed toward said shaft, and a second end portion parallel to said shaft;

installing a commutator on said armature shaft adjacent said first end of said shaft;

urging each said second end portion radially towards said shaft to force each said second end portion against each said first end portion and to force each said first end portion against said commutator, each said first body portion and each said second body portion defining a gap therebetween; and bonding said second end portion to said first end portion and bonding said first end portion to said commutator;

whereby said rotor may be manufactured without the provision of an insulating body between said upper terminal portion and said lower terminal portion.

2. A method of manufacturing a rotor for a dynamoelectric machine, comprising the steps of:

providing an armature shaft having a slotted armature core mounted thereto;

placing a plurality of conductive windings in slots of said slotted armature to form at least a two-layer winding, each said slot containing at least an upper conductor and a lower conductor, each said upper conductor having an upper terminal portion and each said lower conductor having a lower terminal portion, said upper terminal portion and said lower terminal portion being disposed adjacent a first end of said armature shaft;

bending each said lower terminal portion toward said shaft at a first portion adjacent said armature core and away from said shaft at a second portion adjacent a free end of said lower terminal to form a first body portion directed towards said shaft and a first end portion parallel to said shaft;

bending each said upper terminal portion away from said shaft at a fifth portion adjacent said armature core and bending each said upper terminal portion towards said shaft at a sixth portion adjacent said fifth portion and distal to said armature core, and bending each said upper terminal portion away from said shaft at a seventh portion adjacent said sixth portion and distal to said armature core to form a third body portion generally parallel to said shaft, and a third end portion parallel to said shaft;

installing a commutator on said armature shaft adjacent said first end of said shaft;

urging each said second end portion radially towards said shaft to force each said second end portion against each said first end portion and to force each said first end portion against said commutator, each said first body portion and each said second body portion defining a gap therebetween; and bonding said second end portion to said first end portion and bonding said first end portion to said commutator;

whereby said rotor may be manufactured without the provision of an insulating body between said upper terminal portion and said lower terminal portion.

3. A method of manufacturing a rotor according to claim 1 or 2, including the further step of:

shearing a first tip portion from said first end portion and shearing a second tip portion from said second end portion to define a first trimmed free end of said first end portion and a second trimmed free end of said second end portion before said step of urging said second end portion radially toward said shaft;

whereby machining of said commutator to trim said first and second end portions is avoided.

4. A method of manufacturing a rotor according to claim 1 or 2, wherein:

said step of bonding said second end portion to said first end portion and bonding said first end portion to said commutator includes the steps of:

passing an electrical current through said first end portion and said second end portion and said commutator to heat said first end portion and said second end portion and said commutator; and brazing said second end portion to said first end portion and brazing said first end portion to said commutator.

5. A method of manufacturing a rotor according to claim 1 or 2, wherein:

said step of installing said commutator includes the step of providing a commutator segment assembly including a plurality of commutator segments, each said segment defining a groove at one end thereof adapted to receive a portion of one said first end portion;

said commutator segment assembly being disposed on said shaft so that said groove is adjacent said armature core.

6. A method of manufacturing a rotor according to claim 1 or 2, including the further step of:

circumferentially bending each said first end portion in an equal circumferential distance in a first direction and circumferentially bending each said second end portion in an equal distance in a second direction so that each said second end portion is radially aligned with one said first end portion before the step of urging each said second end portion radially towards said shaft.

* * * * *